United States Patent [19]

Mittra

[11] Patent Number: 5,748,736
[45] Date of Patent: May 5, 1998

[54] SYSTEM AND METHOD FOR SECURE GROUP COMMUNICATIONS VIA MULTICAST OR BROADCAST

[76] Inventor: Suvo Mittra, 87 Mission Ridge Ct., Fremont, Calif. 94539

[21] Appl. No.: 665,195

[22] Filed: Jun. 14, 1996

[51] Int. Cl.[6] .................................................. H04K 1/00
[52] U.S. Cl. ........................... 380/21; 380/9; 380/49; 380/48
[58] Field of Search .................... 380/21, 48, 9, 380/20, 49

[56] References Cited

U.S. PATENT DOCUMENTS

| | | | |
|---|---|---|---|
| 4,531,020 | 7/1985 | Wechselberger et al. | 178/22.08 |
| 4,658,093 | 4/1987 | Hellman | 380/25 |
| 4,658,292 | 4/1987 | Okamoto et al. | 380/20 |
| 4,736,422 | 4/1988 | Mason | 380/20 |
| 5,036,518 | 7/1991 | Tseung | 371/32 |
| 5,309,516 | 5/1994 | Takaragi et al. | 380/45 |
| 5,400,403 | 3/1995 | Fahn et al. | 380/21 |
| 5,539,737 | 7/1996 | Lo et al. | 380/9 |
| 5,548,646 | 8/1996 | Aziz et al. | 380/23 |
| 5,588,060 | 12/1996 | Aziz | 380/21 |
| 5,640,393 | 6/1997 | Lo et al. | 380/49 |
| 5,668,877 | 9/1997 | Aziz | 380/21 |

OTHER PUBLICATIONS

Ballardie, T. [1996], "Scalable Multicast Key Distribution", RFC 1949, Network Working Group, May 1996.

Ballardie, T. [1995], "Scalable Multicast Key Distribution", IETF Working Draft (expired), 1995.

Berkovitz, S. [1991], "How to Broadcast a Secret", Advances in Cryptology—Eurocrypt '91 Proceedings, Springer-Verlag, Berlin, 1991, pp. 535-541.

Chiou, G. C., and W. C. Chen [1989], "Secure Broadcasting Using the Secure Lock", IEEE Transactions on Software Engineering, vol. SE-15, No. 8, Aug. 1989, pp. 929-934.

Fiat, A., amd M. Naor [1994], "Broadcast Encryption", Advances in Cryptology: Proceedings of CRYPTO '93, Lecture Notes in Computer Science, No. 773, Springer-Verlag, Berlin, 1994, pp. 480-491.

Haller, N., and R. Atkinson [1994], "On Internet Authentication", RFC 1704, Network Working Group, 1994.

(List continued on next page.)

*Primary Examiner*—David C. Cain
*Attorney, Agent, or Firm*—Limbach & Limbach

[57] ABSTRACT

A system and method for secure group communication via multicast or broadcast transmission. In preferred embodiments, the system of the invention implements a secure multicast group consisting of senders, receivers, a group security controller (GSC), and at least one trusted intermediary (TI) server. The GSC and each TI server are responsible for maintaining the security of the group by authenticating and authorizing all other members of the multicast as well as managing the group key(s) (Kgrp(s)) that are used to encrypt the messages multicast to the group. Any member of the group may have more than one role at a time. For example, senders may also be receivers, and the GSC may be combined with one of the senders. Each TI server is a trusted intermediary, which is a special type of sender and receiver. The TI servers create a (logical) hierarchy of secure multicast networks (a secure distribution tree) that makes the system of the invention scalable (able to practically implement a group of any number of members). Some embodiments of the system implement a security protocol supporting data confidentiality, source authentication, data integrity, and sender non-repudiation. Implementation of the system does not require use of any specific security technology (i.e. cryptographic and authentication tools). The decision to use one technology over another is left to the implementor.

43 Claims, 3 Drawing Sheets

OTHER PUBLICATIONS

Harney, H., Muckenhirn, C., and T. Rivers [1994a], "Group Key Management Protocol (GKMP) Architecture", IETF Working Draft (expired), 1994.

Harney, H., Muckenhirn, C., and T. Rivers [1994b], "Group Key Management Protocol (GKMP) Specification", IETF Working Draft (expired), 1994.

Deering, S. E. [1988], "Multicast Routing in Internetworks and Extended LANs", *Proceedings of the ACM SIGCOMM '88*, Stanford, California, Aug. 1988, pp. 55–64.

Jordan, F., and M. Medina [1994], "Secure Multicast Communication Using A Key Distribution Center", IFIP Transactions C: Communication Systems, vol. C–23, 1994, pp. 367–380.

SYSTEM AND METHOD FOR SECURE GROUP COMMUNICATIONS VIA MULTICAST OR BROADCAST

REFERENCES CITED

U.S. patents

| | | |
|---|---|---|
| 4,531,020 | Jul., 1985 | Weschelberger, et. al. |
| 4,658,292 | Apr., 1987 | Okamoto, et. al. |
| 4,736,422 | Apr., 1988 | Mason |
| 5,036,518 | July 31, 1991 | Tseung |
| 5,309,516 | May, 1994 | Takaragi, et. al. |
| 5,400,403 | Mar., 1995 | Fahn, et. al. |

OTHER PUBLICATIONS

Ballardie, T. [1996], "Scalable Multicast Key Distribution", RFC 1949, Network Working Group, May 1996.

Berkovitz, S. [1991], "How to Broadcast a Secret", Advances in Cryptology-EUROCRYPT '91 Proceedings, Springer-Verlag, Berlin, 1991, pp. 535–541.

Chiou, G. C., and W. C. Chen [1989], "Secure Broadcasting Using the Secure Lock", IEEE Transactions on Software Engineering, Vol. SE-15, No. 8, August 1989, pp. 929–934.

Deering, S. E. [1988], "Multicast Routing in Internetworks and Extended LANs", Proceedings of the ACM SIGCOMM '88, Stanford, Calif., August 1988, pp. 55–64.

Fiat, A., and M. Naor [1994], "Broadcast Encryption", Advances in Cryptology: Proceedings of CRYPTO '93, Lecture Notes in Computer Science, No. 773, Springer-Verlag, Berlin, 1994, pp. 480–491.

Haller, N., and R. Atkinson [1994], "On Internet Authentication", RFC 1704, Network Working Group, 1994.

Harney, H., Muckenhirn, C., and T. Rivers [1994a], "Group Key Management Protocol (GKMP) Architecture", IETF Working Draft (expired), 1994.

Harney, H., Muckenhim, C., and T. Rivers [1994b], "Group Key Management Protocol (GKMP) Specification", IETF Working Draft (expired), 1994.

Jordan, F., and M. Medina [1994], "Secure Multicast Communication Using A Key Distribution Center", IFIP Transactions C: Communication Systems, Vol. C-23, 1994, pp. 367–380.

TECHNICAL FIELD

The subject invention relates to a security system for communications networks. The invention is an improved system and method for secure group communications using multicast and/or broadcast transmissions.

BACKGROUND OF INVENTION

Introduction

Multicasting is a network service that provides for efficient delivery of data from a source to multiple recipients (i.e., the network multicast group). Under multicasting only one copy of the data will pass over any link in the network and copies of the data will be made only where the paths diverge. Thus, multicasting reduces sender transmission overhead, bandwidth requirements, as well as the latency observed by receivers. A tutorial on multicasting can be found in Deering [1988].

In recent years, there has been a great deal of interest in the use of multicast. Typical applications of multicast include resource discovery, videoconferencing, video-on-demand, and so called groupware applications such as whiteboards. As this technology is increasingly deployed by the business community the need to protect multicast transmissions against security attacks will increase.

Secure multicasting is concerned with controlling access to the data being transmitted in a multicast. The central problem in doing this is having the senders and receivers share a secret (the group key) that they can use to encrypt the data being multicast and managing the key as the multicast group membership changes. The key must be changed when a new member is added to the group membership (called a secure join) so that the new member is not able to decrypt data that was multicast previous to its joining and to which it should not have access. The key must also be changed when an existing member leaves the group (called a secure leave) so that the former member is not able to continue decrypting data after it is no longer in the group.

Note that a secure multicast group and a network multicast group are not the same thing. There is only one secure multicast group which is a logical abstraction created by the system to control access to data that is being multicast using a network (or "hardware") multicast group or groups. Any receiver can typically become a part of a network multicast group. However, if it is not also a part of the secure multicast group it will not be in possession of the keys require to decrypt the multicast transmissions.

Networks that do not support multicasting (e.g satellite networks) often do support broadcasting and multicasting can be simulated by broadcasting and vice versa. The difference being that the use of broadcasting can result in wasted network bandwidth sending data to entities that are not a part of the multicast group. Unless noted specifically, the term "multicast" is used in a broad sense in all instances thereof in the remainder of this document, to denote either a "multicast" or a "broadcast."

Multicasting may also be simulated using multiple unicasts (i.e., instead of sending one multicast transmission, each member of the group is individually sent the transmission by unicast). Again, the term "multicast" is used in a broad sense in all instances thereof in the remainder of this document to denote either a true multicast, or a broadcast, or a multicast simulated with multiple unicasts.

Prior Art

A number of schemes have been proposed to solve the problem of secure multicasting. However, none of these schemes are scalable. That is, they cannot efficiently handle large group sizes and/or frequent changes in group membership. In fact, the second problem concerning frequent changes to group membership (related to the problem of handling secure joins and secure leaves), is such that it is often not handled properly by these protocols under normal operation because it is so inefficient. A number of schemes that have been proposed are presented below.

Ballardie [1996] has presented the Scalable Multicast Key Distribution scheme as a part of the CBT (Core Based Trees) multicasting architecture. In this proposal each multicast group has a group key distribution center (GKDC) that controls access to the group. As routers (which distribute the multicast in CBT) join the multicast, the functionality of the GKDC is "passed on" to these routers. When a node decides to join the group, it contacts the nearest router that is acting as a GKDC which then authenticates the joining node and passes it the group key.

Drawbacks: The scheme does not adequately address the issue of secure joins and secure leaves. In normal operation, the group key is not changed when a member joins or leaves the group. Section 8 of [Ballardie 1996] mentions the need to "exclude certain group members from all or part of a group's communication" but can offer no solution but to require a new group key to be distributed via the establishment of a newly-formed group. This is clearly not scalable because it requires all the other members of the secure multicast group to individually reauthenticate. In addition, establishment of a new group implies the formation of a new distribution tree (CBT tree) which entails considerable overhead.

In its quest for scalability, this protocol also does not provide a high level of security in many environments (as pointed out in Section 7 of [Ballardie 1996]. The job of any network security protocol is to protect data as it is being transmitted through an insecure network and a router (which in this scheme enforces group membership and distributes group keys) is inherently part of the insecure network. The solution is to place final control of the group membership in the hands of the single GKDC which, of course, destroys the scalability of the scheme.

Finally, this scheme is tied to and dependent upon support from the network (i.e. the routers that implement the routing protocol). And, this limits the generality of the protocol to networks that support a hard state, CBT-style multicast protocol (that has not been evidenced commercially).

Other protocols for secure multicast have been presented by Harney et al. [1994a; 1994b], Jordan et al. [1994], and in U.S. Pat. No. 5,036,518, issued Jul. 30, 1991, to Tseung. While each is a different protocol they share many aspects. Each of them relies on a per group key distribution center (KDC), also called the group controller (GC) in the Group Key Management Protocol (GKMP) proposed by Harney et al. and called the management station (MS) by Tseung. All members contact this KDC and upon successful authentication they receive the group key which they then use to decrypt multicast transmissions.

Drawbacks: As with Ballardie's scheme these protocols do not adequately handle secure joins and secure leaves. Changing the group key when a member joins or leaves entails creating a new group just as in Ballardie's scheme with all it attendant scalability problems.

In addition, these schemes do not scale in distributing the group key because they require that all group members individually communicate with a single central authority which can become a bottleneck in addition to a single point of failure.

A number of references suggest methods that may be useful in constructing a system for secure multicast. See, for example, Chiou et al. [1989], Berkovitz [1991], Jordan et al. [1994], Fiat et al. [1994], and U.S. Pat. Nos. 4,531,020, 4,658,292, 4,736,422 and 5,309,316. In general all of these are not scalable because they require each group member to individually communicate with a central authority (either explicitly or implicitly through multicast messages that are proportional in size to the number of members in the group) and/or potentially require storage at each member, proportional to the number of the groups.

In general, Haller et al. [1994] teaches us that "For multicast sessions, key management is harder because the number of exchanges required by the widely used techniques is proportional to the number of participating parties. Thus, there is a serious scaling problem with current published multicast key management techniques."

SUMMARY OF THE INVENTION

The subject invention is a system for secure group communication via multicast or broadcast transmission. In preferred embodiments, the system of the invention implements a secure multicast group (the "group") consisting of senders, receivers, a group security controller (GSC), and some number of trusted intermediary (TI) servers. The GSC and each TI server are responsible for maintaining the security of the group by authenticating and authorizing all other members of the multicast as well as managing the group keys (Kgrps) that are used to encrypt the messages multicast to the group. Any member of the group may have more than one role at a time. For example, senders may also be receivers, and the GSC may be combined with one of the senders.

Each TI server is a trusted intermediary, which is a special type of sender and receiver. The TI servers create a (logical) hierarchy of secure multicast networks (the secure distribution tree) that makes the system of the invention scalable (able to practically implement a group of any number of members).

Some embodiments of the system implement a security protocol having one or more of a variety of security features, including data confidentiality, source authentication, data integrity, sender and receiver non-repudiation, proofs of submission and delivery, and anonymity. Preferred embodiments of the system support only data confidentiality, source authentication, data integrity, and sender non-repudiation.

Implementation of the inventive system does not require use of any specific security technology (i.e. cryptographic and authentication tools). The decision to use one technology over another is left to the implementor.

Until the present invention, key management in conventional secure multicast protocols did not scale well to large group sizes and very dynamic group memberships. Unfortunately, many multicast applications imply large group sizes with dynamic group membership (e.g. video on demand). Properly configured the system described herein is designed to scale to billion+ members.

As in the design of most security protocols, the present invention makes no assumptions regarding the level of security available in the network and regards all links and all equipment within the network with suspicion. Trust is placed only (though not equally) in the senders, the trusted group security controller (GSC), the current group of receivers, and a group of trusted intermediaries (the TI servers). Of course, well known, secure key distribution centers (KDCs) and certificate authorities (CAs) may also be used as required by the security technology used to build a specific implementation of one of the protocols. Their design is well known in the art.

The present invention makes minimal assumptions concerning the network in which the system operates. The system does not assume any specific type of network, and in principle can be implemented to operate in any kind of network. For example, data networks such as the Internet, public telephone networks, and cable TV (CATV) networks are all suitable platforms on which to deploy the inventive system. At a minimum, the system requires that the underlying network provide a unicasting mechanism as well as a multicasting mechanism. However, no further assumptions are made concerning the multicasting service beyond the most basic requirement of all multicast services: that given data and a multicast group specifier (for example, a IP multicast address) the multicast service makes a best effort attempt to deliver the data to the group members. In implementing the invention, any of a variety of choices can be made regarding multicast service channel setup and teardown mechanisms, sender vs. receiver-orientation of the multicast service, quality of service guarantees, and state of the service that must be maintained (these are independent of the invention). Furthermore, all characteristics with regard to the performance characteristics of the network and the technology used to build it are also independent of the system.

It should be understood that while the characteristics of the network and the services it provides may greatly shape an actual implementation of one of the protocols employed by the inventive system, it does not change the general architecture of the inventive system.

No assumptions are made concerning any specific cryptographic and authentication tools used to implement the inventive system. It is only required that tools are provided to implement a method of securely encrypting data, generating message integrity codes, signing messages, and handling mutual authentication with key exchange. It should be understood that while a specific implementation may choose to support only a subset of all the appropriate security tools, the system is independent of the specific tools that are deployed.

No assumptions are made concerning the type of data being secured by the invention. All types of data including voice, video, and raw data can be securely multicast with this system. However, the type of data being secured may influence the choice of specific cryptographic and authentication tools used to implement the system but as noted above the system itself is independent of the tools used to create any given implementation of the system.

Features and advantages of the invention include methods of secure multicasting and broadcasting that:

1. provide total security including: data confidentiality, source authentication, data integrity, and sender non-repudiation;

2. do not assume any specific type of network (the Internet, public telephone networks, cable TV networks, etc. are all candidates on which to deploy the invention), and assume only a network supporting a best effort multicast or broadcast service along with a separate unicast service;

3. are independent of specific cryptographic tools used in any given implementation;

4. are scalable; and 5. do not require specialized hardware by any of the members of the multicast group.

Other features and advantages of the invention will become apparent from a consideration of the drawings and ensuing description. Also within the scope of the invention are the methods implemented by each embodiment of the inventive system.

DETAILED DESCRIPTION OF THE PREFERRED EMBODIMENTS

Figure 1:
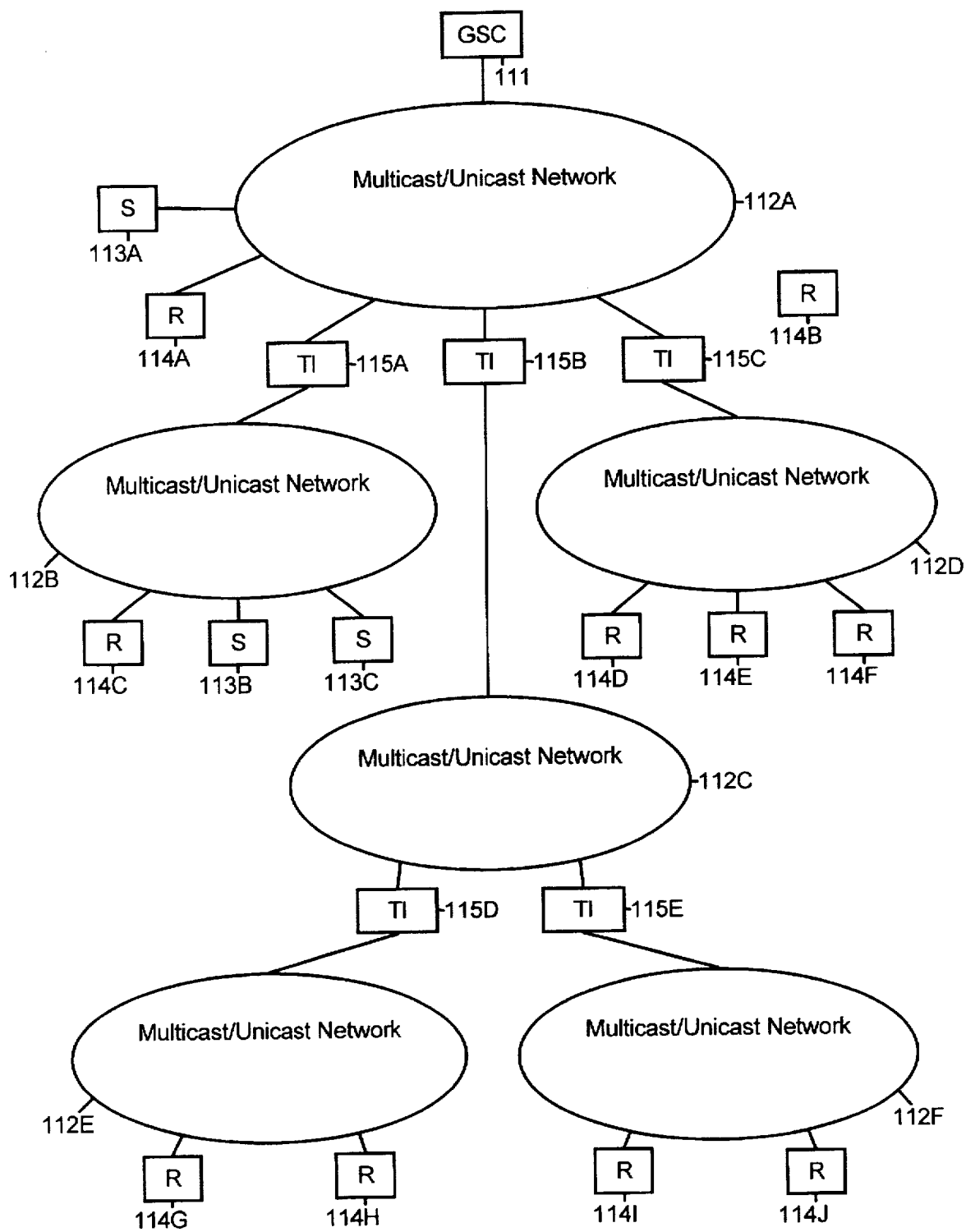
FIG. 1 is a block diagram of a system (embodying the invention) including a GSC, senders, receivers, and TI servers.

The system of FIG. 1 includes a group security controller (GSC 111), senders, receivers, and TI servers. GSC 111 uses multicast/unicast network 112a to create the top level of the secure distribution tree. In the top level group are sender 113a, receivers 114a and 114b, and TI servers 115a, 115b, and 115c which create the second level of the secure distribution tree using multicast/unicast networks 112b, 112c, and 112d. The group using network 112b contains senders 113b and 113c and receiver 114c. The group using network 112d contains three receivers 114d, 114e, and 114f. The group using network 112c contains two more TI servers 115d and 115e that create the third level in the secure distribution tree using multicast/unicast networks 112e and 112f. The group using network 112e contains receivers 114g and 114h. The group using network 112f contains receivers 114i and 114j.

Figure 2:
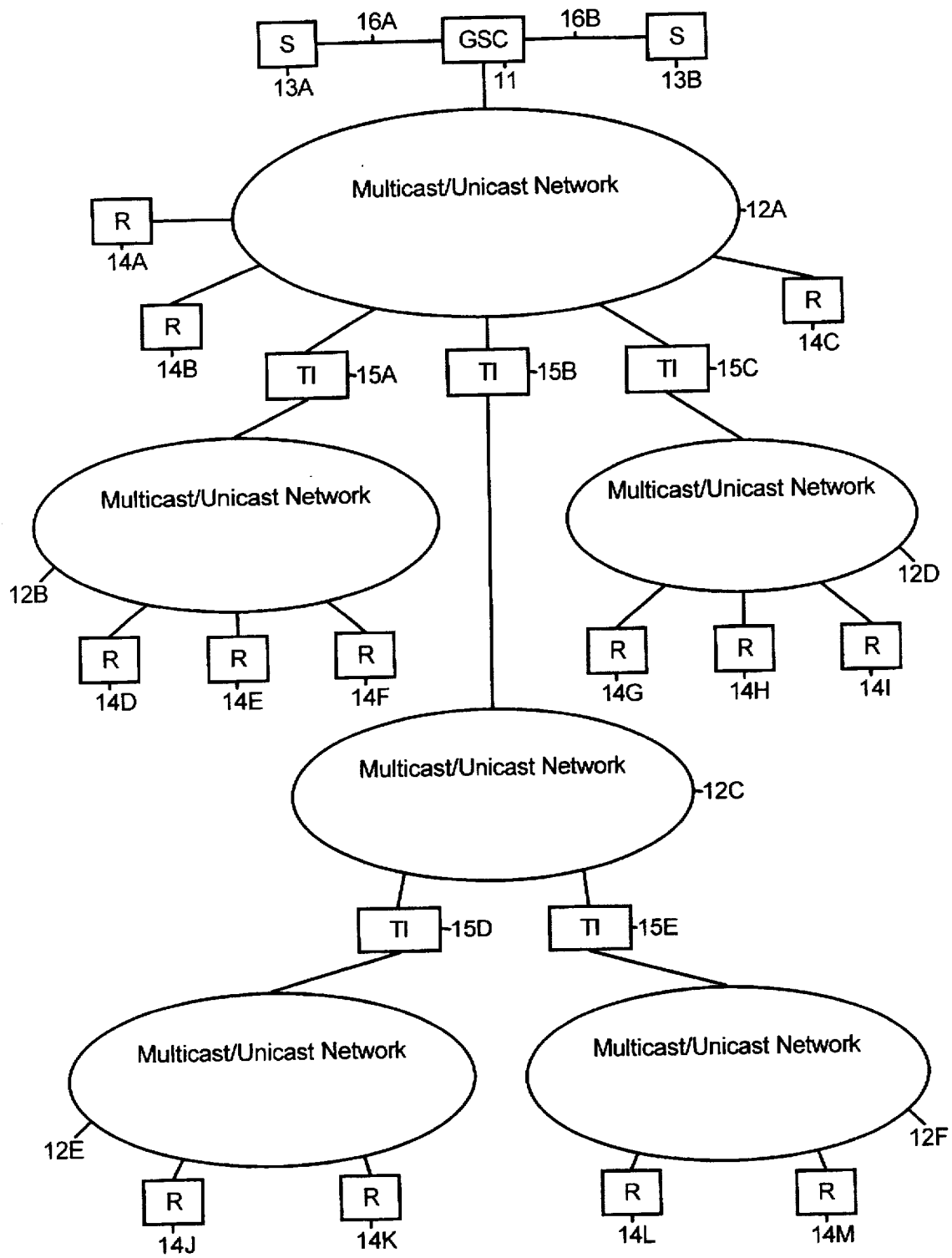
FIG. 2 is a block diagram of another system (embodying the invention) including a GSC, senders, receivers, and TI servers.

The system of FIG. 2 includes GSC 11, senders, receivers, and TI servers. In the system of FIG. 2, senders 13a and 13b are not a part of the group per se. They communicate with GSC 11 via secure channels 16a and 16b, respectively, and GSC 11 multicasts messages on their behalf. Throughout the specification including in the claims, the expressions "secure channel" and "unicast communication line" are used interchangeably, as synonyms. The remainder of the FIG. 2 system is similar to the FIG. 1, with receivers 14a, 14e, and 14f replacing senders 113a, 113b, and 113c, respectively, with receivers 14b, 14c, 14d, 14g, 14h, 14i, 14j, 14k, 14l, and 14m of FIG. 2 corresponding to receivers 114a, 114b, 114c, 114d, 114e, 114f, 114g, 114h, 114i, and 114j of FIG. 1, with TI servers 15a, 15b, 15c, 15d, and 15e of FIG. 2 corresponding to TI servers 115a, 115b, 115c, 115d, and 115e of FIG. 1, and with multicast/unicast networks 12a, 12b, 12c, 12d, 12e, and 12f of FIG. 2 corresponding to multicast/unicast networks 112a, 112b, 112c, 112d, and 112e of FIG. 1, respectively.

Figure 3:
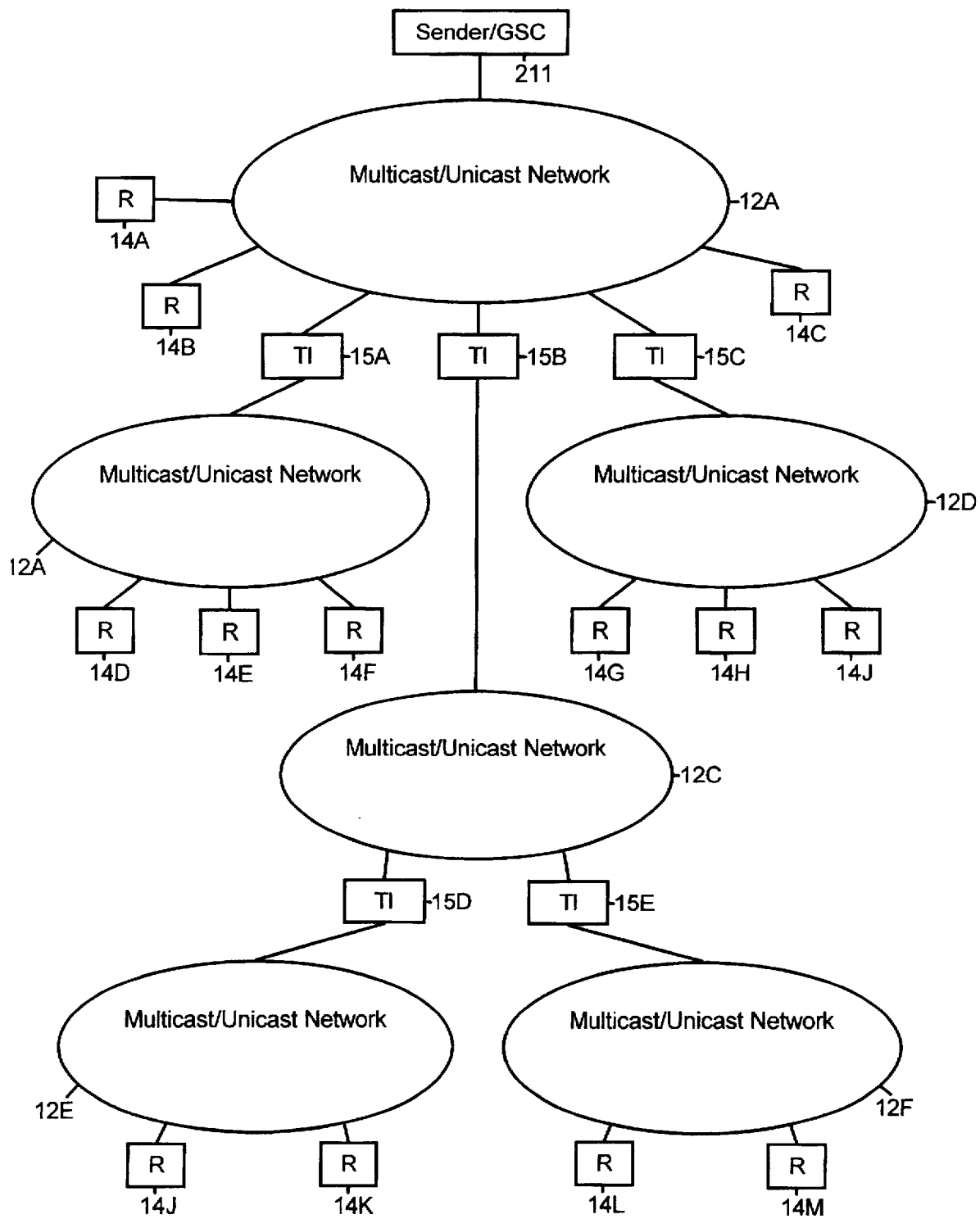
FIG. 3 is a block diagram of another system (embodying the invention) including a combined GSC and sender, receivers, and TI servers.

The system of FIG. 3 includes a combined group security controller and sender (GSC 211), receivers, and TI servers. In this arrangement, GSC 211 performs the functions of both GSC 11 and sender 13a of FIG. 2. The portion of the FIG. 3 system other than GSC 211 is identical to the portion of the FIG. 2 system other than GSC 11 and senders 13a and 13b.

In each embodiment of the inventive system, each GSC, TI server, sender, and receiver is a device, and all such devices are programmed in such a manner that the system can implement a secure multicast. For example, each receiver, sender, GSC, and TI can be a programmed personal computer including a network connection (e.g., to the Internet), and each GSC or TI can be a programmed processor including router circuitry. As noted, any of such devices may have more than one role at a time (e.g., senders may also be receivers, and a GSC may be combined with a sender). In each embodiment of the invention, including the embodiment of FIGS. 1, 2, and 3, the "multicast/unicast network" (e.g., multicast/unicast network 112a of FIG. 1) is a general purpose network which provides unicast services (and thus supports secure communication over one or more unicast communication lines) and also provides multicast services.

The inventive "secure multicast" group implemented by the FIG. 1 system is controlled by a single group security controller (GSC 111), and the inventive "secure multicast" group implemented by each of the systems of FIGS. 2 and 3 is controlled by a single group security controller (GSC 11 or 211). In each embodiment of the inventive system, the secure multicast group has a hierarchical structure. Each such secure multicast group includes sub-groups, with each of the sub-groups being served by a different TI server. For convenience, we sometimes refer to each sub-group served by a TI server as a "group"(although the overall secure multicast group includes two or more of such sub-groups) and we sometimes also refer to the overall secure multicast group simply as a "group." The overall secure multicast group does not employ a single, common group key. Rather, each TI server multicasts data to the members of its sub-group using its own group key. This independence allows changes in membership of a sub-group to be isolated to the multicast of the corresponding TI server (or the GSC for changes in membership of the sub-group at the top-level).

In addition to data confidentiality provided using encryption, preferred embodiments of the system of the invention also support data integrity, source authentication, and source non-repudiation through the use of message integrity codes (MIC) and/or digital signatures.

Preferred embodiments of the inventive system will be explained by describing the phases of their operation.

In the interest of clarity, aspects of preferred embodiments of the system are first described without reference to use of trusted intermediaries. Use of trusted intermediaries is explicated afterwards.

Beginning a Secure Multicast

There are three types of entities participating in a secure multicast: senders, receivers, and a group security controller (GSC). The GSC (e.g., GSC 111 of FIG. 1) provides key management and thus effectively controls secure multicast group ("the group") membership. As far as the system is concerned all that is required to begin a secure multicast is that the GSC is started up. Once this is done, senders and receivers apply to join the group as described below. Possibly, other operations may need to be performed as required by the underlying multicast service (e.g. channel/state setup) but these operations are not a part of the inventive system.

Note that although these entities are described as being separate, they may in fact be in combined. In particular, a sender may also be a receiver of the multicast group, and the GSC and sender may be combined (as shown in FIG. 3).

Joining a Secure Multicast Group

Joining a secure multicast group requires the joining member first to set up a separate secure channel with the GSC of the group (using a unicast communication line). The purpose of the secure channel is to facilitate and isolate confidential communication between the GSC and this member during the time that the member is part of the group.

Upon receiving a join request (and approving it), the GSC inserts the member's identification and information concerning the secure channel in a private database it maintains. In this way the GSC has full knowledge of the group membership and can communicate with each member separately and securely when required. The member must also store information concerning the secure channel for future communication with the GSC.

All communications from the GSC must include a message digest and be digitally signed so that receivers may verify that the message has not been corrupted and the sender was actually the GSC.

Only the GSC maintains information concerning group membership; members do not know about each other (except that receivers may need to know the list of authorized senders). However, it should be noted that the invention does not protect against traffic analysis as a method of gaining information about group membership.

The secure channel can be set up using any of the authentication protocols that are well known in the literature that provide mutual authentication and the exchange of a secret (i.e., a key) that can be used to encrypt farther communication between the GSC and this member. Candidate authentication protocols include Kerberos and Needham-Schroeder on which it is based, as well as protocols such as Otway-Rees and Bellovin-Merritt.

Note that the secure channel need not be kept "alive" at all times. It may be set up and torn down as needed assuming enough state (which is system dependent) is kept at both the GSC and the member.

Once the GSC and the new member have authenticated each other and have agreed on a secret the GSC needs to provide the new member with information that will allow it to encrypt and/or decrypt the multicast transmission. At this point the GSC also needs to change the group key (Kgrp) which provides access to the multicast transmissions. This is done to prevent the joining member from decrypting previous transmissions to which it should not have access.

Once the new Kgrp has been generated by the GSC, the current multicast group and the joining member all need to be apprised of the new Kgrp. To do this the GSC sends a multicast transmission containing the new Kgrp encrypted using the old Kgrp to the current multicast group telling them to now use the new Kgrp. This assumes that all senders are also receivers; if this is not the case, senders that are not also receivers need to be notified individually using the separate secure channels the GSC maintains with each of the senders.

The newly joined member is independently informed of the new Kgrp via the separate secure channel that the GSC had just created with it.

Leaving a Secure Multicast Group

There are two cases under which a member leaves a group. In the first case, the member voluntarily wishes to disconnect and needs to notify the GSC of its intention so that the GSC may change the Kgrp and then provide a confirmation to the leaving member. In the second case, the GSC decides it no longer wants a particular member within the group, changes the Kgrp, and notifies the member of its termination of group membership.

The important point is that the Kgrp is changed (in accordance with the invention) when a member leaves a group just as when a new member joins the group. The Kgrp is changed when a member (receiver) leaves the group to prevent the receiver that has left the group from continuing to decrypt the remaining transmission.

The GSC must use a group key distribution scheme to apprise the members of the new Kgrp. A number of these are mentioned in the prior art. One suitable scheme would be to use the separate secure channel that it has set up with each of the members to selectively inform them of the new Kgrp. However, instead of sending them separate messages it can simply send one leave update message using the multicast channel that contains n copies of the new Kgrp (assuming n remaining members) each encrypted with the key for the secure channel that the GSC keeps with each of the different members. In effect, the GSC would send a list of pairs (id, {New Kgrp} Kmember-GSC), where the "id" is a unique id for a member and the second portion is the new Kgrp encrypted using the key that the GSC keeps for private conversation with that member. Again, if senders are not also receivers they need to be notified via the separate secure channel each sender maintains with the GSC.

In general, note that Kgrp needs to be changed for both secure joins and secure leaves only when a member that will hold/or does hold the Kgrp joins/leaves the group. For example, if senders are not given the Kgrp (as discussed below) a secure join or leave dealing with a sender only does not need to change Kgrp.

Also, note that although absolute security dictates that the Kgrp be changed on every secure join and secure leave, this need not be the case in practice. In certain situations, for example when no sensitive data is being multicast it may be acceptable to not change the Kgrp as members join and leave.

Unreliable Multicast

There are a number of problems that arise if a secure multicast group member does not receive a join or leave update message:

Receivers failing to receive join update messages will not be able to continue decrypting multicast transmissions after the change in Kgrp.

Senders failing to receive a join update message will encrypt transmissions using an outdated Kgrp resulting in receivers that cannot decrypt its transmissions.

Receivers failing to receive a leave update message will be unable to continue decrypting multicasting transmissions and also introduce a security compromise because they may accept multicast transmissions from senders that have been removed from the group.

Senders failing to receive a leave update message will also continue encrypting transmissions using an outdated Kgrp thereby confusing receivers. More importantly, security may be compromised because senders encrypting transmissions using an old Kgrp will allow former group members to continue decrypting multicast transmissions.

These situations must be considered if the multicast is unreliable (as often it is). There are two basic approaches to solving these problems: 1) make the update reliable by having the group members participate in a group commit protocol such as the two-phase commit protocol, which is well known in the art, or 2) modify the transmission subsystem so that updates do not result in security compromises and/or lost data. There is not much to say concerning the first approach except that it is likely to be inefficient. The second approach is described as part of the following discussion of methods for sending multicast transmissions.

Sending Multicast Transmissions

When senders send multicast messages to the group they must be encrypted. Optionally, senders also include a message digest so that malicious corruption of the message may be automatically detected. Any number of techniques for generating a message digests known in the art may be used (for example, MD5 and SHS).

As mentioned above, various embodiments of the inventive system can employ different encryption tools to encrypt the messages. A number of encryption algorithms including private key algorithms, such as DES and IDEA, and a public key algorithm, such as RSA, can alternatively be used. However, given a encryption algorithm, a choice must be made with regard to the key (or key pairs when using a public key algorithm) that is used to encrypt the data. There are three choices for the value of this key (Kencrypt):

1. Kencrypt=Kgrp.

In this case, the sender encrypts the message with the group key and then multicasts the message. (This is the embodiment that has been discussed so far.)

Advantages: Simplicity and high-performance.

Disadvantages: Possible security compromises and/or receiver confusion when used with a unreliable multicast service (as discussed previously). It is possible to mitigate some of the disadvantages at the cost of performance by requiring senders to send their messages to the GSC instead of directly multicasting it. In this way, the GSC can ensure that an obsolete Kgrp has not been used as the Kencrypt and assuming it has stored the previous Kgrp keys, the GSC can decrypt the message and re-encrypt the message with the current Kgrp. Note, however, that this does not do away with the potential for security compromises because the sender transmits the message using an old Kgrp before the GSC has a chance to correct the problem.

2. Kencrypt=Ksender-GSC (i.e. the key that the sender shares with the GSC for purposes of communicating over the secure channel, or any other key that the sender and GSC agree on and that is unique to that sender and the GSC).

In this case, after encryption, the sender sends the message to the GSC which decrypts the message and re-encrypts it with the current Kgrp before multicasting it. (This embodiment is shown in FIG. 2.)

Advantages: High security; the GSC maintains complete control over all transmissions to the group and there are no problems related to the sender using an old Kgrp to send the message. Also, under this scheme, pure senders are not part of the group and do not need to be informed of changes to the group membership (via the join and leave update messages). By the same token, the addition and deletion of senders do not change group membership and so do not result in join and leave updates.

Disadvantages: GSC must decrypt and re-encrypt all messages must be sent to the GSC prior to being multicast.

3. Kencrypt=a random key chosen by the sender (or by the GSC which transmits it to the sender using the secure channel it has with the sender). The random key must be changed after each message. The generation of the random key is beyond the scope of this discussion (it may, for example, be generated using a pseudo-random number generator known in the art).

In this case, in addition to everything else, the message must contain the random key itself encrypted with either the Kgrp or the Ksender-GSC. The security of this scheme is the same as that of the first scheme or the second key, depending on whether Kgrp or Ksender-GSC is used to encrypt the random key. However, its performance is much better if the message must be decrypted and re-encrypted. This is because decrypting and re-encrypting to allow access to the message involves only decrypting and re-encrypting the random key. The message itself is encrypted with the random key which does not need to be changed.

Advantages: High performance as the bulk of the message is encrypted only once by the sender using the random key.

Disadvantages: Same security disadvantages of scheme 1 if Kgrp is used to encrypt the random key. Potential for a security compromise in the face of a cryptanalytic attack if bad choices are made with regard to the random key.

In some embodiments, the system also supports source authentication and sender non-repudiation. This can be accomplished by having senders digitally sign all messages (or their message digests) sent to the group. Procedures for digitally signing messages are well known in the art, for example, using the DSS or ElGamal signature schemes. It should be noted that some public-key encryption algorithms such as RSA that can be used to encrypt the message provide an implicit signature.

If source authentication is only being performed between the sender and the GSC, message integrity codes (MICs) may be used in place of digital signatures for source authentication between the sender and GSC.

In addition, some embodiments of the inventive system provide support to allow receivers to verify that a sender has permission to send to the group according to the GSC. A simplistic solution is to have receivers verify a sender's authorization by individually contacting the GSC. However, this does not scale. There are three other methods all of which require the use digital signatures by the GSC:

1. The GSC can send a message to the receivers with the identification of a sender when a sender joins and leaves the group. Note that if sender joins and leaves result in join and leave update messages, this message may simply be piggy-backed on the join or leave update message.

Advantages: GSC does not need to sign individual messages and no per-message signature overhead.

Disadvantages: Possible security compromises and/or receiver confusion when used with a unreliable multicast service (as discussed previously). Requires receiver storage to store sender lists. GSC cannot stop a sender from sending to the group at will. It may be possible for the GSC to try and send a certificate revocation to receivers but in the face of network partitions it may not be possible to communicate with all receivers.

Comments: Suitable for groups with a small number of senders and/or relatively stable sender memberships in the group.

2. The GSC can provide senders with digitally signed certificates that contain the senders identification and information such as timestamp(s) that indicate the period during which the sender is authorized to send. The certificates are negotiated using the secure channel the GSC and new ones must be negotiated when a current certificate expires. Senders send the certificates, which are unforgeable, along with any message it sends to the group.

Advantages: GSC does not need to sign individual messages.

Disadvantages: GSC cannot stop a sender from sending to the group at will. It may be possible for the GSC to try and send a certificate revocation to receivers but in the face of network partitions it may not be possible to communicate with all receivers.

Comments: Suitable if the GSC can be reasonably sure, in advance, that it will want to let a sender have access to the group for a specified period of time.

3. The GSC can digitally sign each message when it is multicast. This is done by having the sender sign the message before sending it to the GSC which also signs it (signaling its approval to the receivers), before multicasting it.

Advantages: High security.

Disadvantages: GSC needs to sign each message and messages need to sent to the GSC prior to being multicast.

Comments: The only choice if no security compromise can be tolerated.

Rekeying

In embodiments based on either the source-tree model or the shared-tree model, the Kgrp will eventually "wear out" with use (i.e. in the face of known and chosen plaintext attacks) and will need to be replaced. Rekeying of the multicast group is straightforward using any well known key update scheme. For example, the GSC may multicast the new Kgrp to the group using the old Kgrp.

As in other systems a (group) key encrypting key (Kgkek), separate from Kgrp, may be used to perform rekeying. In this case, the Kgkek would be generated, changed, and distributed along with the Kgrp. The Kgrp would then be used only for encrypting multicast transmissions while the Kgkek would be used to encrypt the distribution of the new Kgrp and Kgkek during rekeying and distribution of new versions of those keys (e.g., during a secure join/leave). The use of a Kgkek is not assumed in remainder of this document in the interest of clarity and simplicity.

It is also assumed that separate secure channels between the GSC and each of group members are rekeyed periodically.

Ending a Secure Multicast

From the point of view of the system, ending a secure multicast requires only that the GSC for the group be shutdown. The GSC will typically inform the members of the end of the secure multicast as part of the shutdown. As with the procedure for beginning a secure multicast, the local multicast service may require other operations be performed when ending the multicast (e.g. channel/state teardown) but that is outside the scope of the present invention.

Trusted Intermediaries

The use of trusted intermediaries in accordance with the invention serves to create a logical hierarchy within the inventive secure multicast group (i.e., the secure distribution tree). Multicast messages are distributed to the top level multicast sub-group (the top level multicast "group"). Trusted intermediaries in the top level multicast group redistribute the message by multicasting it to their sub-groups ("groups") which in turn may include other trusted intermediaries.

A trusted intermediary (TI) is a special server that runs on a trusted machine. TI servers are not conventional routers (conventional routers are insecure machines, not trusted machines, which implement a network routing protocol). It is contemplated that some embodiments of the invention include at least one TI server which runs on a trusted machine, where the trusted machine implements a network routing protocol (of a type implemented by a conventional router) and is also programmed to perform the functions (described herein) of a TI server in accordance with the invention.

TI servers are grouped according to "levels" with lower levels generally having greater numbers of servers than higher levels. TI servers at a given level "consume"multicast messages from their parent TI server (or the sender(s)/rendezvous point(s)) and multicast the data to their children. Consumption of data by a TI server refers to its decryption of the multicast data it receives using the Kgrp being used to multicast data from its parent and then encrypting the data with a (separate) Kgrp it uses to multicast data to its children.

In accordance with the invention, TI servers are authorized to act as proxies for the GSC. Each TI server can approve changes in group membership below it (i.e., it can approve changes in group membership in the sub-group served thereby), thus isolating the effects of these changes in group membership from the GSC and the members that are not associated with the TI server approving the change. Thus, a TI server acts as the GSC for members of "its"

multicast group. This isolation to changes allows the inventive system to scale well to groups with large memberships and frequent changes in membership.

Each TI server multicasts data to the members of "its" multicast group using its own group key. This independence allows changes in membership of a group (corresponding to one TI server) to be isolated to the multicast of that TI server. Changes in membership of a top-level group are handled by the GSC (e.g., a leave of receiver 114b of FIG. 1 from the group implemented by the FIG. 1 system would be handled by GSC 111 rather than by a TI server).

The number of TI servers, the number of levels of TI servers, and their placement is not fixed and can be varied depending on the characteristics of the network and the group. Also, TI servers can be created on a per group basis (e.g., under the control of the group's GSC) or there can a number of well known, reliable TI servers that can be used by a number of groups.

Next, we describe the manner in which preferred embodiments of the inventive system operate with TI servers.

Beginning a Secure Multicast (with Trusted Intermediaries)

The procedure for beginning a secure multicast is the same as described above (without reference to trusted intermediaries) except that the TI servers can also be started along with the GSC. Each TI server then applies to join the group, as does each receiver and sender as described above. The difference is that not all entities are able to access the multicast at the same point. TI servers apply to join using the same procedure employed by senders and receivers, but when a TI server authenticates with either the GSC or a parent TI server it also receives a access control list (ACL) to perform authentication for its children.

An ACL is simply a list containing authorizations (e.g., entity A can receive, entity B can send and receive, and entities X–Z cannot send or receive).

Joining a Secure Multicast Group (with Trusted Intermediaries)

From the joining member's vantage, joining a secure multicast group is identical to the procedure described above (without reference to trusted intermediaries) except that the member either contacts its parent TI server or the GSC depending on its access point in the hierarchy of the group. If the access point is at a level such that the joining member contacts not the GSC but a parent TI server (e.g., in the case that receiver 114f of FIG. 1 seeks to join the group consisting of all elements of FIG. 1 other than receiver 114f, in which case receiver 114f would contact TI server 115c rather than GSC 111), the TI server performs authentication on behalf of the GSC and changes the Kgrp (for its sub-group) using the above-described procedure performed by the GSC (to perform authentication and change the Kgrp). However, in order to do this, the TI server in turn must first be registered with its parent TI server or the GSC. If it is not, the TI server performs a registration with its parent TI server (or the GSC) prior to registering the joining member.

Leaving a Secure Multicast Group (with Trusted Intermediaries)

Again, from the leaving member's viewpoint the procedure for leaving a group is the same as the procedure described above (without reference to trusted intermediaries), except that a leaf TI server performs the above-described function of the GSC (where the "leaf TI server" is that TI server serving the leaving member which is nearest to the leaving member in the hierarchy of the group). The leaf TI server also has the option of leaving the group itself if it has no children interested in the multicast.

Sending Multicast Transmissions (with Trusted Intermediaries)

If a sender is a member of the top level multicast group, sending is done in the manner described above (without reference to trusted intermediaries). If not, however, a sender must unicast the data to its leaf TI server, which then unicasts the message to its parent TI server, on up till a TI server at the top level receives the message. At this point, the top level TI server multicasts the message on behalf of the original sender using the same techniques as before.

The unicasts to the parent TI server at each level may be encrypted using any scheme presented earlier, except those schemes that make use of Kgrp. Kgrp cannot be used to encrypt the unicasts as it would allow receivers at a lower level to decrypt the message before it is actually multicast from the top of the secure distribution tree. Note the message may need to be decrypted and re-encrypted as it makes its way to the top of the secure distribution tree to account for crossing of sub-group boundaries.

Source authentication and sender non repudiation are done as described above (without reference to trusted intermediaries). However, if MICs are being used to provide source authentication between the sender and the TI server, the MIC must be regenerated at each level of the multicast distribution tree. This is because a MIC is valid only between a sender-receiver pair and the sender-receiver pair changes as the message is unicast up the secure distribution tree.

The schemes to support receiver verification of a sender's authorization to send to the group may be done as described above, with the following changes:

1. Scheme 1: cannot be used because it exposes subgroup membership changes to the entire group.

2. Scheme 2: requires that receivers be willing to accept certificates signed by an arbitrary TI server. Alternatively, each TI server can arrange with the GSC to share a common secret (i.e., a key) that may be used to digitally sign certificates.

3. Scheme 3: requires that receivers be willing to accept messages signed by an arbitrary TI server. Alternatively, each TI server can arrange with the GSC to share a common secret (i.e., a key) that may be used to sign messages.

The sharing of the common secret that may be required by schemes 2 and 3 may be arranged by having the GSC or a TI server pass the common secret to a TI server when it joins the secure multicast group much like the access control list is passed down the hierarchy of TI servers from the GSC on TI server joins.

Rekeying (with Trusted Intermediaries)

Rekeying is accomplished as described above (without reference to trusted intermediaries) except that rekeying occurs separately at each node in the secure distribution tree. The GSC can set policy concerning the rekey interval but the rekeying is carried out by each TI server separately.

Ending a Secure Multicast (with Trusted Intermediaries)

Ending the secure multicast requires the GSC to inform each of its child TI servers of the multicast termination so that they may release state concerned with the multicast. The child TI servers in turn inform the TI servers below them and so on.

Changing Access Control (with Trusted Intermediaries)

The GSC has the option of changing the access permissions for a secure multicast at any time. However, its policy is carried out by the TI servers. To change the permissions, the GSC creates a new ACL reflecting the new permissions. The GSC then removes from the group any top level TI server it no longer wants in the group and contacts the remaining TI servers (at the top level) to send them the new ACL. The top level TI servers then perform this same algorithm on the TI servers and members below them thus propagating the changes down the hierarchy.

Various modifications and variations of the described embodiments of the invention will be apparent to those skilled in the art without departing from the scope and spirit of the invention. Although the invention has been described in connection with specific preferred embodiments, it should be understood that the invention as claimed should not be unduly limited to such specific embodiments.

What is claimed is:

1. A system for implementing a secure multicast group in a scalable manner, said system including:

a group security controller which encrypts data with a first group key and causes the encrypted data to be multicast to a first sub-group; and a number of trusted intermediary servers, wherein each of the trusted intermediary servers can encrypt data with a different group key and cause the differently encrypted data to be multicast to a different sub-group, wherein each said different group key is different from the first group key and each said different sub-group is different from the first subgroup, and wherein the group security controller and each of the trusted intermediary servers form a logical hierarchy of sub-groups which determine said secure multicast group, with the first sub-group at a top level of said hierarchy and each of the sub-groups associated with a different one of the group security controller and the trusted intermediary servers.

2. The system of claim 1, wherein the trusted intermediary servers include a first trusted intermediary server associated with a sub-group at a first level of the hierarchy, the first level is lower than at least one other level of the hierarchy, the first trusted intermediary server can decrypt a message that has been multicast from said other level using a group key associated with said other level, and the first trusted intermediary server can reencrypt the message using a group key different from the group key associated with said other level and initiate a multicast of the reencrypted message to the sub-group at said first level.

3. The system of claim 1, wherein each of the trusted intermediary servers acts as a full proxy to exactly one of the group security controller or another of the trusted intermediary servers.

4. The system of claim 1, wherein each member of the secure multicast group communicates over a network having protocols, and the group security controller and the trusted intermediary servers are independent in design of the network and said protocols.

5. The system of claim 1, wherein the group security controller causes the encrypted data to be broadcast to the first sub-group, and said each of the trusted intermediary servers causes the differently encrypted data to be broadcast to said different sub-group.

6. The system of claim 1, wherein the group security controller causes the encrypted data to be multicast other than via broadcast to the first sub-group, and said each of the trusted intermediary servers causes the differently encrypted data to be multicast other than via broadcast to said different sub-group.

7. The system of claim 1, wherein the group security controller causes the encrypted data to be multiply unicast to the first sub-group, and said each of the trusted intermediary servers causes the differently encrypted data to be multiply unicast to said different subgroup.

8. The system of claim 1, wherein the trusted intermediary servers include a first trusted intermediary server associated with a second sub-group and a second group key, said system also including:

a receiver which communicates with the first trusted intermediary server, wherein in response to a request from the receiver for permission to join the secure multicast group, the first trusted intermediary server attempts to authenticate the receiver and check that the receiver has permission to join the secure multicast group, and upon determining that the receiver has said permission, the first trusted intermediary server securely distributes the second group key to the receiver.

9. The system of claim 1, wherein the trusted intermediary servers include a first trusted intermediary server associated with a first sub-group and a second group key, said system also including:

a receiver which communicates with the first trusted intermediary server, wherein in response to a request from the receiver for permission to join the secure multicast group, the first trusted intermediary server attempts to authenticate the receiver and checks that the receiver has permission to join the secure multicast group, and upon determining that the receiver has said permission, the first trusted intermediary server determines a new group key to replace the second group key and securely distributes the new group key to the receiver and all members of the second sub-group that hold the second group key.

10. The system of claim 1, also including:

a receiver which communicates with the group security controller, wherein in response to a request from the receiver for permission to join the secure multicast group, the group security controller attempts to authenticate the receiver and checks that the receiver has permission to join the secure multicast group, and upon determining that the receiver has said permission, the group security controller determines a new group key to replace the first group key and securely distributes the new group key to the receiver and all members of the first sub-group that hold the first group key.

11. The system of claim 1, also including:

a receiver which communicates with the group security controller, wherein in response to a request from the receiver for permission to join the secure multicast group, the group security controller server attempts to authenticate the receiver and check that the receiver has permission to join the secure multicast group, and upon determining that the receiver has said permission, the group security controller server securely distributes the first group key to the receiver.

12. The system of claim 1, wherein the trusted intermediary servers include a first trusted intermediary server associated with a second sub-group and a second group key, said system also including:

a receiver which communicates with the first trusted intermediary server, wherein in response to a request to cause a first member of the second sub-group to leave the secure multicast group, the first trusted intermediary server determines a new group key to replace the second group key and securely distributes the new group key to all members of the second sub-group that hold the second group key other than said first member.

13. The system of claim 1, also including:

a receiver which communicates with the group security controller, wherein in response to a request to cause a first member of the first sub-group to leave the secure multicast group, the group security controller determines a new group key to replace the first group key and securely distributes the new group key to all members of the first sub-group that hold the first group key other than said first member.

14. The system of claim 1, wherein the trusted intermediary servers include a first trusted intermediary server associated with a second sub-group and a second group key, said system also including:

a sender which communicates with the first trusted intermediary server, wherein in response to a request from the sender for permission to join the secure multicast group, the first trusted intermediary server attempts to authenticate the sender and check that the sender has permission to join the secure multicast group, and upon determining that the sender has said permission, the first trusted intermediary server securely distributes the second group key to the sender.

15. The system of claim 1, wherein the trusted intermediary servers include a first trusted intermediary server associated with a second sub-group and a second group key, said system also including:

a sender which communicates with the first trusted intermediary server, wherein in response to a request from the sender for permission to join the secure multicast group, the first trusted intermediary server attempts to authenticate the sender and check that the sender has permission to join the secure multicast group.

16. The system of claim 1, wherein the trusted intermediary servers include a first trusted intermediary server associated with a first sub-group and a second group key, said system also including:

a sender which communicates with the first trusted intermediary server, wherein in response to a request from the sender for permission to join the secure multicast group, the first trusted intermediary server attempts to authenticate the sender and checks that the sender has permission to join the secure multicast group, and upon determining that the sender has said permission, the first trusted intermediary server determines a new group key to replace the second group key and securely distributes the new group key to the sender and all members of the second sub-group that hold the second group key.

17. The system of claim 1, also including:

a sender which communicates with the group security controller, wherein in response to a request from the sender for permission to join the secure multicast group, the group security controller attempts to authenticate the sender and checks that the sender has permission to join the secure multicast group, and upon determining that the sender has said permission, the group security controller determines a new group key to replace the first group key and securely distributes the new group key to the sender and all members of the first sub-group that hold the first group key.

18. The system of claim 1, also including:

a sender which communicates with the group security controller, wherein in response to a request from the sender for permission to join the secure multicast group, the group security controller attempts to authenticate the sender and check that the sender has permission to join the secure multicast group, and upon determining that the sender has said permission, the group security controller securely distributes the first group key to the sender.

19. The system of claim 1, also including:

a sender which communicates with the group security controller, wherein in response to a request from the sender for permission to join the secure multicast group, the group security controller attempts to authenticate the sender and check that the sender has permission to join the secure multicast group.

20. A system for implementing a secure multicast group in a scalable manner, said system including:

a group security controller which encrypts data with a first group key and causes the encrypted data to be multicast to a first sub-group; and a number of trusted intermediary servers, wherein each of the trusted intermediary servers can encrypt data with a different group key and cause the differently encrypted data to be multicast to a different sub-group, wherein each said different group key can be different from the first group key and each said different sub-group is different from the first sub-group, and wherein the group security controller and each of the trusted intermediary servers form a logical hierarchy of sub-groups which determine said secure multicast group, with the first sub-group at a top level of said hierarchy and each of the sub-groups associated with a different one of the group security controller and the trusted intermediary servers.

21. A system for implementing a secure multicast group in a scalable manner, said system including:

a security controller which controls access to the secure multicast group; and a sender which communicates with the security controller, and wherein the security controller is programmed with verification software for responding to a message received from the sender by verifying that the sender has permission to send said message to the secure multicast group, wherein upon determining that the sender has said permission, the security controller generates a digital signature and multicasts the message with said digital signature to at least a sub-group of the group.

22. The system of claim 21, wherein the security controller is a group security controller.

23. The system of claim 21, wherein the security controller is a trusted intermediary server.

24. The system of claim 21, also including:

a receiver which receives multicast transmissions from any member of the group, wherein the receiver is programmed with verification software for responding to said message by verifying that the sender has permission to send to the secure multicast group as evidenced by the digital signature.

25. A system for implementing a secure multicast group in a scalable manner, said system including:

a sender;

a security controller which controls access to the secure multicast group and communicates with the sender over a secure channel, wherein the security controller is programmed with software for verifying that the sender has permission to send data to the secure multicast group and upon determining that the sender has said permission, for causing the security controller to generate a digitally signed certificate and send said digitally signed certificate to the sender, wherein upon receiving the digitally signed certificate, the sender multicasts data to at least a sub-group of the group with said digitally signed certificate.

26. The system of claim 25, wherein the security controller is a group security controller.

27. The system of claim 25, wherein the security controller is a trusted intermediary server.

28. The system of claim 25, also including:

a receiver which receives multicast transmissions, wherein the receiver is programmed with verification software for responding to said message by verifying that the sender has permission to send to the secure multicast group as evidenced by inclusion of said digitally signed certificate.

29. A system for implementing a secure multicast group in a scalable manner, said system including:

a group security controller;

a trusted intermediary server which communicates with the group security controller over a multicast network; and at least a first receiver which communicates with the trusted intermediary server over a second multicast network, wherein the trusted intermediary server is programmed with software for responding to a request from a prospective group member to join the secure multicast group by performing an authorization operation, and upon successful completion of the authorization operation determining a new group key and sending the new group key to the prospective group member and to the first receiver over the second multicast network.

30. The system of claim 29, also including:

a second receiver which communicates with the trusted intermediary server over a second multicast network, wherein the trusted intermediary server is also programmed with software for responding to a request from a prospective group member to leave the secure multicast group by determining a second new group key and sending the second new group key to the first receiver over the second multicast network.

31. The system of claim 29, also including:

a second receiver which communicates with the trusted intermediary server over a second multicast network, wherein the trusted intermediary server is also programmed with software for responding to a request from the group security controller to cause the second receiver to leave the secure multicast group by determining a second new group key and sending the second new group key to the first receiver over the second multicast network.

32. A system for implementing a secure multicast group in a scalable manner, said system including:

a group security controller;

a first trusted intermediary server which communicates with the group security controller over a first multicast network;

a second trusted intermediary server which communicates with the first trusted intermediary server over a second multicast network; and at least a first receiver which communicates with the second trusted intermediary server over a third multicast network, wherein the second trusted intermediary server is programmed with software for responding to a request from a prospective group member to join the secure multicast group by performing an authorization operation, and upon successful completion of the authorization operation determining a new group key and sending the new group key to the prospective group member over a secure channel and to the first receiver over the third multicast network.

33. The system of claim 32, also including:

a second receiver which communicates with the first trusted intermediary server over the second multicast network, and wherein the second trusted intermediary server communicates with the first receiver over the third multicast network using a first group key, and the first trusted intermediary server communicates with the second receiver over the second multicast network using a second group key.

34. The system of claim 33, also including:

a third receiver which communicates with the group security controller over the first multicast network, and wherein the group security controller communicates with the third receiver over the first multicast network using a third group key.

35. A method for implementing a secure multicast group in a scalable manner, said method including the steps of:

in response to a request from a prospective group member to join the secure multicast group, operating a first device to perform an authorization operation;

upon successful completion of the authorization operation, operating the first device to determine a new group key, and causing the new group key to be sent from the first device to the prospective group member over a unicast communication line and to current members of at least a sub-group of the group over a multicast network; and in response to a request to cause a first current member of the sub-group to leave said sub-group, operating the first device to determine a second new group key, and causing the second new group key to be sent to current members of the sub-group, other than said first current member, over said multicast network.

36. The method of claim 35, wherein the first device is a trusted intermediary server which communicates with said current members of the sub-group over the multicast network, and wherein the trusted intermediary server communicates with a group security controller over a second multicast network.

37. A method for implementing a secure multicast group in a scalable manner using a system including a group security controller, a first trusted intermediary server which communicates with the group security controller over a first multicast network, a second trusted intermediary server which communicates with the first trusted intermediary server over a second multicast network, and at least a first member which communicates with the second trusted intermediary server over a third multicast network, said method including the steps of:

(a) responding to a request from a prospective group member to join the secure multicast group by operating the second trusted intermediary server to perform an authorization operation; and (b) upon successful completion of the authorization operation, determining a new group key and sending the new group key to the prospective group member over a unicast communication line and to the first member over the third multicast network.

38. The method of claim 37, wherein the system also includes a second member which communicates with the first trusted intermediary server over the second multicast network, said method also including the steps of:

communicating with the first member over the third multicast network using a first group key; and communicating with the second member over the second multicast network using a second group key.

39. The method of claim 38, wherein the system also includes a third member which communicates with the group security controller over the first multicast network, and also including the step of:

communicating with the third member over the first multicast network using a third group key.

40. The method of claim 37, wherein the secure multicast group includes a first sub-group which is served by the second trusted intermediary server, and wherein said method also includes the steps of:

in response to a request to cause a first current member of the first sub-group to leave said group, operating the second trusted intermediary server to determine a second new group key, and causing the second new group key to be sent to current members of the first sub-group, other than said first current member, over said third multicast network.

41. A method for adding a new receiver to an existing group of receivers, the group currently receiving data over a multicast network, said data being encrypted with one of a first group key or a third key encrypted with said first group key, and said data being distributed via at least one of a group security controller and a sender, said method comprising the steps of:

transmitting a request to join the existing group of receivers by the new receiver to the group security controller;

performing an authorization procedure which includes supplying a second group key to the new receiver from the group security controller, said authorization procedure being carried out over a unicast communication line;

transmitting the second group key encrypted with the first group key to the existing group of receivers over the multicast network; and transmitting data over the multicast network encrypted with one of the second group key or a fourth key encrypted with said second group key.

42. A network protocol method for dropping a receiver from a group of receivers, the group currently receiving data over a multicast network encrypted with a first group key, said data being distributed via at least one of a group security controller and a sender, said method comprising the steps of:

generating, at the group security controller, a second group key;

distributing the second group key to each of the receivers remaining in the group; and transmitting data over the multicast network encrypted with the second group key.

43. The system of claim 8, wherein each member of the secure multicast group communicates over a network having protocols, and the group security controller and the trusted intermediary servers are independent in design of the network and said protocols.

* * * * *